May 22, 1962   G. H. BINGHAM, JR   3,035,291
METHOD OF MAKING FOOTWEAR HAVING WATERPROOF SOLES
Filed March 5, 1958   2 Sheets-Sheet 1
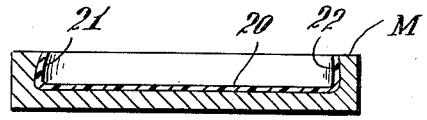
Fig. 1
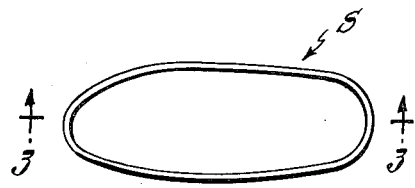
Fig. 2
Fig. 3
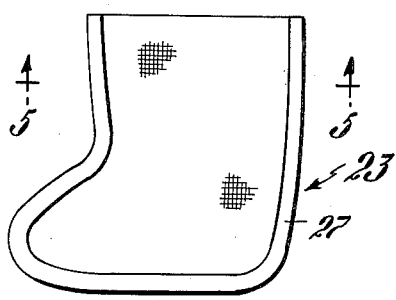
Fig. 4
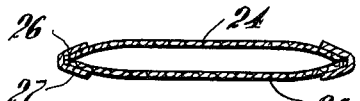
Fig. 5
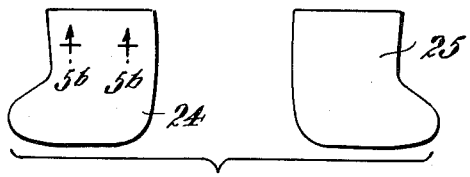
Fig. 5a
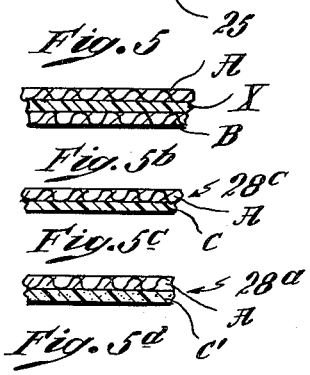
Fig. 5b
Fig. 5c
Fig. 5d
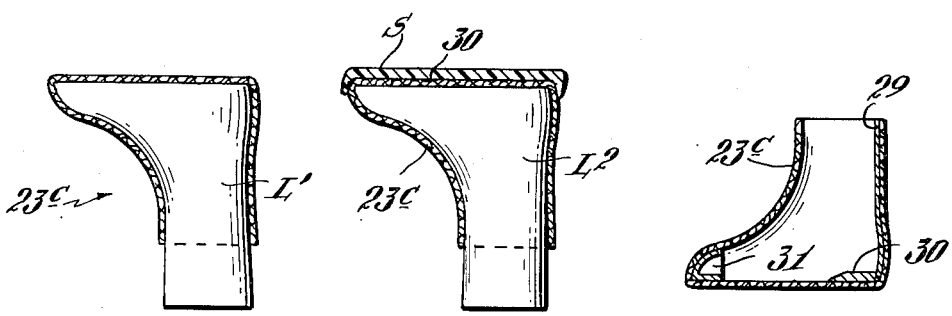
Fig. 6   Fig. 7   Fig. 8
Inventor
George H. Bingham, Jr.
by Roberts Cushman Grount
Att'ys

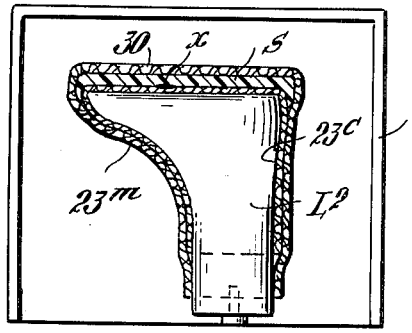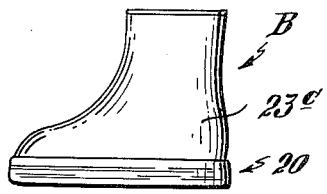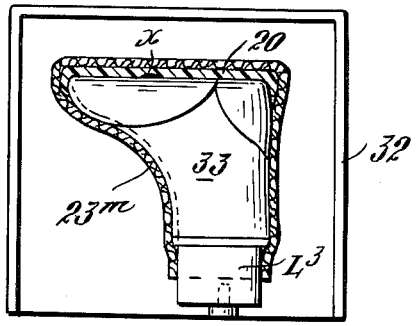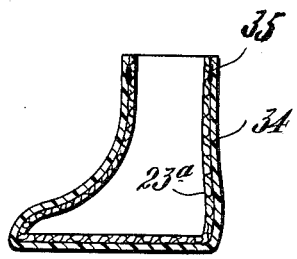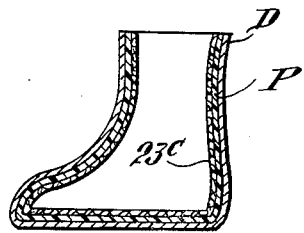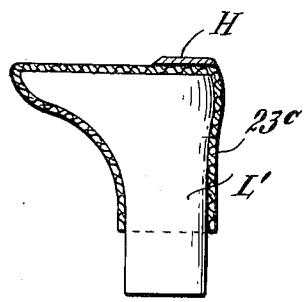

United States Patent Office 3,035,291
Patented May 22, 1962

3,035,291
METHOD OF MAKING FOOTWEAR HAVING WATERPROOF SOLES
George H. Bingham, Jr., Westminster, Md., assignor to Cambridge Rubber Company, Taneytown, Md., a corporation of Maryland
Filed Mar. 5, 1958, Ser. No. 719,388
3 Claims. (Cl. 12—142)

This invention pertains to footwear, more especially to articles of footwear which, for brevity but without limiting intent, are herein included under the general term "boots," whether lined or unlined, and particularly to boots which have waterproof outer soles, for example of rubber (natural or artificial) or plastic (whether or not reinforced or combined with textile or other fibrous or non-resilient material) and whose uppers may be of any of the customary materials employed in the manufacture of footwear, for example leather or textile fabric, either with or without an impregnant coating or film of waterproofing material, or wherein a ply or film of waterproofing material (for example rubber or plastic) is bonded to one surface of a ply of textile material or is interposed between plies (whether like or unlike) of textile fabric, and relates more especially to a novel method of making boots of the above types and variations thereof.

The invention has for an object the provision of a novel method of making boots having waterproof soles. A further object is to provide a method of making boots such that the outer sole may be made independently of other parts of the boot, if desired, so that such outer soles may be stored in readiness for use when a seasonal demand for such footwear would tax the capacity of the boot manufacturer if he were dependent upon the customary practice of boot-making. A further object is to provide a method of making boots such as to make possible the employment of rubber and plastic, in combination, for example a rubber outer sole and a plastic upper or vice versa, or a plastic lining and a rubber outer ply in a boot upper. A further object is to provide a novel method such that a rainproof boot may be provided with a textile lining which, if desired, may be loose (that is to say, free to move relatively to an outer skin of waterproof material through a greater or lesser extent of its area. A further object is to provide a novel method whereby a boot whose entire exposed outer surface, including the outer sole and upper, is of rainproof material such as plastic, produced as a unit by a molding operation, and later provided with a lining (either a complete lining or a part-lining) as desired. A further object is to provide a method of making a boot whose upper, while waterproof, presents a textile surface both internally and externally and having such upper firmly and permanently bonded to a waterproof outer sole. A further object is to provide a method of making a boot having an unlasted upper (that is to say, an upper which is not shaped by the customary methods of lasting) and wherein the upper is bonded to a waterproof outer sole.

A further object is to provide a novel method of holding constituent parts of a boot in assembled relation while the assembly is subjected to a treatment, for example a curing or vulcanizing operation, such as to bond the constituent parts of the boot together to form a unitary structure. Other and further objects and advantages of the invention will be pointed out in the following more detailed description and by reference to the accompanying drawings wherein:

FIG. 1 is a diagrammatic, transverse section through a mold of a type which may be employed in the manufacture of a so-called "cup-sole" useful in some aspects of the present method;

FIG. 2 is a plan view of a cup-sole made by the use of the mold of FIG. 1;

FIG. 3 is a diagrammatic section on the line 3—3 of FIG. 2;

FIG. 4 is a side elevation of a so-called "sock" such as may be employed in the practice of certain phases of the invention;

FIG. 5 is a section on the line 5—5 of FIG. 4;

FIG. 5a is a diagrammatic plan view showing two blanks cut from suitable material for use in making the sock of FIG. 5;

FIG. 5b is a diagrammatic section on the line 5b—5b of FIG. 5a, illustrative of one type of fabric which may be employed in making such a sock as that of FIG. 4;

FIG. 5c and FIG. 5d are sections, similar to FIG. 5b, but respectively illustrating other types of fabric;

FIG. 6 is a diagrammatic, front-to-rear section through a last having mounted thereon a sock like that of FIG. 3;

FIG. 7 is a view similar to FIG. 3, but showing a cup-sole, like that of FIG. 2 (with interposed adhesive) assembled with the lasted sock, all in readiness for the performance of the fusing or vulcanizing operation;

FIG. 8 is a diagrammatic, front-to-rear vertical section through a sock which has been shaped by lasting, as shown in FIG. 6, and which has been removed from the last and provided with certain interior parts;

FIG. 9 is a diagrammatic, vertical section through a vulcanizing or fusing chamber, showing the parts illustrated in FIG. 7 as arranged within said chamber, but enveloped in a constrictive jacket such as to keep the parts in intimate contact during the curing operation;

FIG. 10 is a side elevation of the boot after removal from the last;

FIG. 11 is a view, generally similar to FIG. 9, but showing a boot upper, in elevation, such as may be made by customary methods upon an ordinary last, but showing a cup-sole like that of FIG. 2 assembled with the bottom of the lasted boot, the cup-sole being shown in section, and the assembly enveloped in a constrictive envelope also shown in section, operative to hold the parts in intimate contact during a curing operation;

FIG. 12 is a vertical, front-to-rear section diagrammatically illustrating the assembly of a sock, such as that of FIG. 4, with a plastic boot made by a molding process, and showing the sock attached to the boot only near the upper edge of the latter so that the major portion of the sock is loose within the boot proper to form a lining;

FIG. 13 is a diagrammatic, front-to-rear vertical section illustrating the introduction of a sock of the above type into a plastic boot made by the molding process while the plastic forming the boot is still in the uncured state within the mold whereby the entire sock may be made adherent to the plastic boot; and FIG. 14 is a view similar to FIG. 6, but showing a wear piece applied to the heel end of the sock.

Referring to the drawings, the character M indicates a conventional mold, such as is employed in a "slush" molding process, having a cavity whose surface is so shaped and contoured as to impart to moldable material placed therein the shape and surface characteristics of a cup-sole of the desired type. As illustrated in FIG. 1, the interior of this mold has a coating of a waterproof material, for example a synthetic plastic, this coating resulting, for example, from a filling of the mold cavity with the desired plastic, then heating of the mold to cause the plastic, in contact with the mold, to set or coagulate, and the pouring out of the uncoagulated plastic so as to leave the coating on the interior of the mold. Because of the shape of the mold cavity, this coating comprises a part 20 which forms the bottom of the cup-sole, and an upstanding marginal flange which, in particular at the toe and heel portions 21 and 22, leans inwardly or overhangs the bottom 20 so that the area defined by the upper peripheral edge of this flange is somewhat less in extent than the bottom 20. After the coating has thus been formed on the interior of the mold cavity, the mold may be subjected to further heat thereby to cure the coating sufficiently to permit it to be removed from the mold cavity as a unit, although it is preferable to avoid complete curing at this stage in the operation. The resultant cup-sole S is illustrated in FIGS. 2 and 3. It will be understood that the interior shape of the mold is such as to impart to the outer surface of this cup-sole S, including the undersurface of its bottom, any desired pattern, such as the appearance of the rolled edge customary in waterproof footwear.

In accordance with the present method, there is provided a sock 23, FIG. 4, of flexible material which may, if desired, constitute the entire upper of the boot, or the lining of a water-proof boot and which, according to its intended use, may be made of material of various types. For example as illustrated in FIG. 5$^b$, this material may comprise two plies A and B of stretchable textile material, for example stockinet, or woven fabric cut on the bias, arranged in superposed relation with adhesive X interposed between them. Such a multi-ply fabric may be made in long lengths and from this fabric may be cut blanks, such as the blanks 24 and 25 (FIG. 5$^a$) for instance by a suitably shaped die, these blanks being, as here shown, identical in shape and size. While both plies A and B may be of the same material, it is contemplated that they may be of different materials, for instance one ply may be of cotton stockinet and the other ply of nylon stockinet.

Having prepared blanks, such as blanks 24 and 25, they are placed in registry and united by a marginal seam 26, FIG. 5, thus forming what may be termed "an embryo sock" which, when made of multi-ply material, as suggested, consists, in reality, of two socks, one nested within the other, but bonded together by the adhesive X. It may be noted that, in accordance with the preferred procedure, the adhesive X, which unites the plies A and B, is desirably a plastic in an uncured or partially cured condition, but such as lends some degree of stiffness to the united plies when this adhesive has been cured.

Having prepared this embryo sock 23$^c$ by the joining of the blanks 24 and 25, it is now stretched over a last L′, FIG. 6, and if the intended boot is to be of waterproof character, a length of tape 27 (FIGS. 4 and 5), coated on one side with a suitable plastic adhesive, is extended along the seam 26 so as to conceal the stitches of the latter. The sock, in its stretched condition, upon the last L′ is now subjected to a treatment such as to complete the curing of the adhesive X and permanently to bond the tape 27 to the sock, the result being that when the sock is removed from the last L′, it tends to retain the "lasted" shape imparted to it in drawing it over the last so that its upper will stand upright without other support, although it still remains quite flexible. If further stiffening of the sock be desired, it may be sprayed or coated, while on the last, with an appropriate stiffener, for instance, a resin.

Obviously, instead of a mere coating of adhesive X, a ply of substantial thickness consisting, for example of gum rubber or of a suitable synthetic plastic, may be interposed between the textile plies 24 and 25. Such a relatively thick ply or layer of rubber or plastic makes the sock retain its lasted shape to a greater degree after the latter has been stretched over the last and cured than does a mere adhesive film, such as the adhesive X, and would provide a greater degree of resistance to the penetration of moisture.

As illustrated in FIG. 5$^c$, the fabric 28$^c$, from which the blanks 24 and 25 may be cut, has a single ply A of textile fabric which is coated on one side, as shown at C, with rubber or waterproof plastic, thus making possible the provision of a sock whose outer surface, for example, is of rubber or plastic and its inner surface of textile material or vice versa.

As illustrated in FIG. 5$^d$, the material indicated at 28$^a$ consists of a single ply A of textile fabric having on one side a layer C′ of sponge material (either rubber or plastic) which acts as insulation to protect the wearer's foot from cold. In making up the sock employing this material, the sponge layer may be placed at the inside or the outside as may be preferred, although it is usually more desirable to place it at the inside of the boot. In this event, the textile ply A may be of nylon stockinet or other stretchable material providing a desirable external finish.

Having prepared the sock, as above described, from any of the materials above suggested and in accordance with the type of boot to be made, this sock is then drawn over a last L$^2$, FIG. 7, (or the same last L′) and the cup-sole 20, which has been prepared substantially as above suggested, is then assembled with the shaped sock, the completely cured sock being indicated by the character 23$^c$ (FIG. 8). In assembling the cup-sole with the sock, and assuming that the cup-sole S is of proper dimensions such that it must be stretched somewhat to fit it over the bottom of the sock (which is desirable in order to insure firm contact of the cup-sole with the sock), the inverted cup-sole is stretched and its forward flange 21 is hooked over the toe portion of the sock and then the cup-sole is pulled rearwardly and its rear flange portion 22 snapped over the heel portion of the sock. Before assembling the cup-sole with the sock, the exposed bottom surface of the sock may be coated with a suitable adhesive, as indicated at 30, FIG. 7, and, if desired, the inner surface of the cup-sole may also be coated with adhesive. Desirably, this adhesive is of the same type of plastic as that used in making the cup-sole.

With the parts assembled as shown in FIG. 7, they are then enveloped in a jacket 23$^m$, FIG. 9, which may be a sock identical in size with the sock 23, or a sock of very slightly larger dimensions, but preferably one which is strongly constrictive, for example one such as may be made by the use of a textile fabric having inclusions of vulcanized rubber threads. This jacket is drawn over the assembly, shown in FIG. 7, so as to envelop it, as shown in FIG. 9, thus constrictively pressing the entire area of the cup-sole into contact with the exposed surface of the sock. The last L$^2$, with the parts assembled thereon, as above described, is now placed in a suitable container 32 where it is subjected to a curing treatment such as to complete the curing or fusing of the cup-sole, the curing of any stiffening or adhesive material incorporated in the fabric forming the sock, and the curing of the adhesive 30 which is interposed between the cup-sole and sock. At the completion of this curing treatment, the parts are removed from the container 32, the jacket 23$^m$ is stripped from the sock and the latter with the attached cup-sole is removed from the last and the resultant boot B (FIG. 10) may be subjected to any desired finishing operation preparatory to placing it on the market.

As an alternative procedure, after the sock has been stretched over the last L′, FIG. 6, as above described, and suitably treated to make it shape-retaining, it may be removed from the last and, as indicated in FIG. 8, additional elements may be introduced into its interior and bonded to its inner surface. Thus, for example as shown in FIG. 8, a textile tape 29 has been placed in the sock at the rear part, extending from its upper edge to its heel. This textile tape may be of a suitable character for the attainment of various objects, for example, it may be of substantial inherent stiffness so that when bonded to the interior of the sock, it helps to maintain the shape of the latter and to prevent the upper part of the sock from sagging downwardly. On the other hand, the tape employed at this portion of the sock may be of a material, for example nylon, such as to provide a slippery interior surface to assist in donning or doffing the boot, or it may be merely a thin textile tape having substantial tensile strength such as to resist tearing of the sock when pulling it on over the foot. At this stage, other parts may be introduced into the sock 23ᶜ as desired, for instance, a heel pad 30 may be placed in the bottom of the heel portion of the sock and suitably bonded to the inner surface of the sock. This heel pad may be considered as exemplifying any other bottom element, for example a complete insole or an arch support; likewise, a counter-stiffener might be inserted within the sock or, at its toe portion, a toe box or stiffener 31 may be inserted. Likewise, to the upper portion may be bonded the tapes of a slide fastener. It will be understood that, after such interior parts have been put in place and secured in position by a suitable adhesive, preferably a plastic, the operation of uniting the cup-sole to the sock may be carried on as above described with the result that the completed boot will have within it such additional elements as suggested in FIG. 7 and as referred to above. The completed boot is illustrated diagrammatically in FIG. 10 and consists of the upper, constituted by the sock 23ᶜ, and the outer sole, constituted by the cup-sole 20.

While the upper of the shoe is desirably made, in accordance with the present invention, in the form of a prelasted sock, such as is above described, it is contemplated as within certain of the broader aspects of the invention that the upper of the shoe may be made in other ways, for instance by ordinary shoe-making and lasting methods, but that the outer sole may be made, as above described, as a cup-sole and assembled and united to the lasted upper in the manner above described. Such a procedure is illustrated diagrammatically in FIG. 11 wherein the lasted upper 33 is shown mounted on the last L³ and with the cup-sole 20 fitted over the bottom of the lasted upper with interposed adhesive X, and with the constrictive jacket 23ᵐ embracing the assembled parts, and with the entire assembly arranged within a treating chamber 32 wherein the assembly is so treated as to cause the adhesive X to bind the parts firmly together while under constrictive pressure; while, at the same time, completing the curing of the cup-sole and the curing of any other bonding material, whether rubber or synthetic plastic which may be incorporated in the boot.

Instead of employing the sock 23, as above described, to constitute the entire upper of a boot, it is contemplated that it may be employed merely as the lining of a boot. Thus, for example as illustrated in FIG. 12, the numeral 34 indicates the outer skin of a waterproof boot which may, for example, be of rubber or a synthetic plastic and made by a molding process wherein the entire outer skin or shell of the boot, including the upper and the bottom portion, consists of a unitary mass of waterproof material and wherein the sock 23ᵃ is shown as disposed within the interior of this completely cured or fused outer skin 34 and bonded to the latter only along a circumferential band 35 near the top of the boot. With such an arrangement, and assuming that the sock is of a size snugly to fit the interior of the outer skin 34, the sock is free from adhesion to the skin 34 except along the band 35 and thus the major portion of the sock or lining may move relatively to the skin 34. Such an arrangement is highly desirable from the standpoint of foot comfort, in particular because it permits the presence of air between the inner surface of the skin 34 and the sock, thus providing insulating properties and good ventilation for the foot. While, as shown in FIG. 12, the sock is bonded to the outer skin 34 only near the top of the boot, it is obvious that it may be bonded to the outer skin at other selected areas, if desired, in particular to prevent the sock from pulling out of the outer skin too readily when the foot is withdrawn. However, if the sock be prepared as above described, so as to impart a certain degree of stiffness, little difficulty is experienced from the pulling of the sock out of the exterior skin during use. Whether used as the entire upper or only as a lining, the inner surface of the sock defines the foot-receiving chamber of the boot.

As illustrated in FIG. 13, a further procedure may be employed whereby the textile inner sock (constituting a lining) is adhered at all points to the waterproof outer sock or skin. In accordance with this procedure, as illustrated in FIG. 13, the character D indicates a metal mold, such as is used in the molding of plastic boots, this mold being shown as having its inner surface coated with plastic P which is in the coagulated and dried condition, thus providing an embryo inner sock, a sock which is only partially cured or fused. The sock is shown as having been introduced into the interior of this embryo inner sock and as having been brought into snug contact with the inner surface of the plastic coating P. With the parts thus assembled, the mold may be subjected to external heat such as to complete the curing of the layer P of plastic while, at the same time, bonding the textile sock 23 to the inner surface of the plastic sock, thus forming a completely lined, waterproof boot. To insure an intimate contact of the lining and outer skin during such treatment, the interior of the sock may be filled with dry granular material, for example, coarse sand, which may readily be removed when fusing is complete.

It may be noted that in certain of the above-suggested procedures, rubber may be disposed at one side of a textile ply while plastic is in contact with the other side of said textile ply; it has been found that, under such circumstances, during the final curing operation, the rubber and plastic are firmly bonded together by the interposition of the textile ply.

By the above method of procedure, it is readily possible to incorporate a wear-resistant element in the boot bottom, for instance at the heel. Thus, as illustrated in FIG. 14, which shows the sock 23ᶜ stretched over the last L′, as in FIG. 6, a hard, preshaped heel pad H, for example of leather, hard plastic, indurated fiber, or even metal, is shown as having been adhesively secured to the bottom of the sock at the heel, and the cup-sole will then be assembled with the other parts as shown in FIG. 7, thus confining the heel pad H between the sock and outer sole and so providing protection for the outer sole against the cutting action of the tread of a spike heel of a shoe with which the boot may be worn.

While, by way of example, certain desirable procedures have been herein illustrated for the manufacture of footwear according to the present invention, it is to be understood that the invention is broadly inclusive of any and all modifications or substitutions of material or procedural steps within the terms of the appended claims.

I claim:

1. That method of making a waterproof boot which includes the steps of providing a unitary cup sole of partially cured waterproof elastomeric material, providing an elastically stretchable sock comprising at least one ply of textile fabric coated on one side at least with a material which, when appropriately treated, makes the sock shape-retaining, drawing the sock over a last, and so treating the sock that it retains its shape when subsequently removed from the last, assembling the cup sole and the lasted sock with an incompletely cured bonding medium interposed between them, enveloping the assembled parts in an elastically contractile jacket thereby to hold them in intimate contact at all points, and completing the curing of any of the constituent elements of the assembly which have not previously been completely cured.

2. The method according to claim 1, further characterized in that after the sock has been stiffened, and before its assembly with the cup sole, it is removed from the last, and a counter stiffener and a toe stiffener are introduced and adhesively secured in place, and the sock is then relasted prior to its assembly with the cup sole.

3. The method according to claim 1 and which includes the step of providing a cup sole of a length less than that of the foot of the lasted sock, and, in assembling the cup sole and lasted sock, the cup sole is stretched sufficiently to permit the foot portion of the sock to be introduced into the cup sole, the cup sole then being released so that it may contract and elastically grip the lasted sock.

References Cited in the file of this patent

UNITED STATES PATENTS

| | | |
|---|---|---|
| 2,147,197 | Glidden | Feb. 14, 1939 |
| 2,365,103 | Olson | Dec. 12, 1944 |
| 2,586,045 | Hoza | Feb. 19, 1952 |
| 2,641,004 | Whiting et al. | June 9, 1953 |
| 2,659,911 | Spack | Nov. 24, 1953 |

FOREIGN PATENTS

| | | |
|---|---|---|
| 391,101 | Great Britain | July 16, 1931 |
| 582,431 | Great Britain | Nov. 15, 1946 |